(12) United States Patent
Oki

(10) Patent No.: US 10,726,556 B2
(45) Date of Patent: Jul. 28, 2020

(54) INSPECTION APPARATUS AND INSPECTION PROGRAM

(71) Applicant: Konica Minolta, Inc., Chiyoda-ku, Tokyo (JP)

(72) Inventor: Makoto Oki, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 107 days.

(21) Appl. No.: 15/935,317

(22) Filed: Mar. 26, 2018

(65) Prior Publication Data

US 2018/0293732 A1    Oct. 11, 2018

(30) Foreign Application Priority Data

Apr. 11, 2017  (JP) ................................. 2017-078097

(51) Int. Cl.
*G06K 9/00* (2006.01)
*G06T 7/11* (2017.01)
(Continued)

(52) U.S. Cl.
CPC .............. *G06T 7/11* (2017.01); *G06T 7/001* (2013.01); *H04N 1/00092* (2013.01);
(Continued)

(58) Field of Classification Search
CPC ... G06T 7/11; G06T 7/001; G06T 7/30; G06T 7/002; G06T 7/0004; G06T 5/006;
(Continued)

(56) References Cited

U.S. PATENT DOCUMENTS

| 5,548,691 A * | 8/1996 | Sato ....................... B41J 29/393 358/1.12 |
| 7,224,821 B2 * | 5/2007 | Furukawa ............ H04N 1/6052 382/112 |

(Continued)

FOREIGN PATENT DOCUMENTS

| EP | 2 452 819 A1 | 5/2012 |
| EP | 2 642 738 A1 | 9/2013 |

(Continued)

OTHER PUBLICATIONS

Extended European Search Report issued in corresponding European Patent Application No. 18166090.3-1209, dated Aug. 1, 2018 (8 pages).

(Continued)

*Primary Examiner* — Jose L Couso
(74) *Attorney, Agent, or Firm* — Buchanan Ingersoll & Rooney PC

(57) ABSTRACT

An inspection apparatus for inspecting printed matter on which an image is formed, includes: a region extractor that extracts a first region, in which a character is formed, and a second region, in which the character is not formed, with reference to image forming image data used to form the image; and a defect detector that detects a defect in the first region and a defect in the second region in read image data obtained by reading the printed matter on which the image is formed by the image forming image data, wherein the defect detector includes: a first region defect detector that detects loss of a dot in the first region in the read image data; and a second region defect detector that detects presence of a dot with a density equal to or greater than a predetermined density in the second region in the read image data.

12 Claims, 11 Drawing Sheets

(51) Int. Cl.
*G06T 7/00* (2017.01)
*H04N 1/00* (2006.01)

(52) U.S. Cl.
CPC ............... *G06T 2207/10008* (2013.01); *G06T 2207/10024* (2013.01); *G06T 2207/30144* (2013.01); *H04N 1/00063* (2013.01)

(58) Field of Classification Search
CPC . G06T 2207/10008; G06T 2207/10024; G06T 2207/30144; G06T 2207/20021; G06T 2207/30176; H04N 1/00092; H04N 1/00063; H04N 1/46; H04N 1/60; H04N 1/6066; H04N 1/00005; H04N 1/00047; H04N 1/00087; H04N 1/40; H04N 1/6052; H04N 1/4072; H04N 1/7078; H04N 1/6027; H04N 1/6038; B41J 29/46; B41J 29/393; B41J 19/145; G06F 3/12; B41F 33/00; B41F 33/0036; G06K 9/033; G06K 9/036; G06K 15/00; B41P 2233/51
See application file for complete search history.

(56) References Cited

U.S. PATENT DOCUMENTS

| | | | | |
|---|---|---|---|---|
| 7,684,625 B2* | 3/2010 | Hyoki | ................... | G06T 3/0006 |
| | | | | 358/1.2 |
| 8,867,095 B2* | 10/2014 | Hyoki | ................... | H04N 1/6066 |
| | | | | 358/1.13 |
| 9,172,824 B2* | 10/2015 | Kojima | ............... | H04N 1/00005 |
| 2009/0231645 A1* | 9/2009 | Hayashi | ............. | H04N 1/00002 |
| | | | | 358/520 |
| 2009/0244639 A1* | 10/2009 | Itoh | ........................ | G06K 1/121 |
| | | | | 358/3.28 |
| 2010/0091053 A1* | 4/2010 | Jackson | ................. | B41J 2/2139 |
| | | | | 347/9 |
| 2017/0201648 A1* | 7/2017 | Sugahara | ............... | H04N 1/407 |
| 2017/0270642 A1* | 9/2017 | Wada | ........................ | G06K 9/40 |
| 2019/0092025 A1* | 3/2019 | Kawai | .................... | B41J 29/393 |

FOREIGN PATENT DOCUMENTS

| | | |
|---|---|---|
| JP | H07-181139 | 7/1995 |
| JP | 2006-088562 A | 4/2006 |
| JP | 2012-876 A | 1/2012 |
| JP | 2013-179546 A | 9/2013 |
| JP | 2013-196456 | 9/2013 |
| JP | 2013-197860 A | 9/2013 |
| JP | 2014-134401 A | 7/2014 |
| JP | 2015-036937 | 2/2015 |

OTHER PUBLICATIONS

Notification of Reasons for Refusal issued in corresponding Japanese Patent Application No. 2017-078097, dated Jun. 25, 2019, with English Translation (13 pages).
First Office Action issued in corresponding Chinese Patent Application No. 201810298285.X, dated May 29, 2019, with English Translation (21 pages).
Notification of Reasons for Refusal issued in corresponding Japanese Patent Application No. 2017-076097, dated Apr. 2, 2019, with English Translation (17 pages).

* cited by examiner

FIG. 8

| NAME OF REGION | APPLICABLE CRITERIA | | | | INSPECTION TARGET | NOTE |
|---|---|---|---|---|---|---|
| | Y | M | C | K | | |
| CHARACTER REGION | 0 | 0 | 0 | 255 | LOSS OF CHARACTER | LACK OF CERTAIN NUMBER OF CONSECUTIVE REGIONS IS DETERMINED AS LOSS (THE LEFT IS CASE OF BLACK CHARACTER) |
| BACKGROUND REGION | 0 | 0 | 0 | 0 | DEFACEMENT OF BACKGROUND | PRESENCE OF PIXEL WITH A VALUE GREATER THAN PAPER COLOR VALUE IS DETERMINED AS DEFACEMENT |
| OTHER (NON-INSPECTION TARGET REGION) | PORTION NOT APPLICABLE TO CHARACTER REGION AND BACKGROUND REGION | | | | — | COLOR CHARACTER, IMAGE DATA AND THE LIKE ARE NOT INSPECTION TARGETS FOR LOSS OR DEFACEMENT |

FIG. 10B ☐

INSPECTION APPARATUS AND INSPECTION PROGRAM

The entire disclosure of Japanese patent Application No. 2017-078097, filed on Apr. 11, 2017, is incorporated herein by reference in its entirety.

BACKGROUND

Technological Field

The present invention relates to an inspection apparatus and an inspection program for efficiently and accurately inspecting printed matter on which an image is formed, and, particularly, to a technology capable of efficiently and accurately performing inspection even when an image is formed on printed matter of a plurality of sheets with different contents by using different image forming image data.

Description of the Related Art

There is an image forming apparatus in which a reading unit is subsequently connected to an image forming unit which forms an image on a sheet, and the image formed on the sheet is read by the reading unit. Such an image forming apparatus is sometimes used for the purpose of detecting an abnormal sheet (waste paper), on which an abnormal image (waste image) is formed, with reference to the reading results after the image is formed.

Generally in print processing, proof printing is performed as trial printing before mass printing is performed, and the printing results are checked for the presence or absence of abnormality. A read image obtained by reading the output matter at this time is saved as a correct image. Then, in abnormal image detection at the time of final printing, it is usual to compare the correct image prepared in advance with a read image printed at this time and define the read image as an abnormal image if there is a difference.

Incidentally, printing called "variable printing" is sometimes performed, in which most of an image is made common and only a part of the image is changed to be printed. For example, the variable printing is a printing method in which the main body is made common and only the address and name are changed such as in direct mails.

In this type of variable printing, the common image portion can adopt a method of comparing the correct image with the read image described above. On the other hand, different contents are printed in a variable region such as an address or a name, which is different on each individual original sheet, for each sheet so that it is impossible to print and read a correct image in advance for preparation.

Thereupon, image forming image data can be considered to be used as the correct image in the variable region. However, in the comparison between the image forming image data generated by digital data of CMYK which are the basic colors of toner and read image data of the RGB printing results outputted from a scanner, the color spaces and the degrees of blurring of the images are totally different from each other. Thus, the detection precision has been known to be decreased in the comparison between the same read images.

Moreover, there is a problem that using the comparison with the image forming image data including the common region in which the read image can be prepared in advance is disadvantageous in terms of precision.

As this type of technology, various relating proposals have been made in JP 2014-134401 A, JP 2013-197860 A, JP 2013-179546 A and JP 2012-000876 A.

As for the comparison of image data, JP 2014-134401 A proposes that image forming image data and read image data are converted into the Lab space to be compared.

JP 2013-197860 A proposes that different γ corrections are performed for each type of paper.

JP 2013-179546 A proposes that, when there is a color outside the color gamut in image forming image data, the color is converted into a pixel value within the color gamut.

JP 2012-000876 A proposes that a non-variable region=fixed region is used as a comparison target in variable printing.

Incidentally, as described above, a method of preparing a correct image in advance and performing a difference comparison with an inspection target image to determine the presence or absence of abnormality is usual for the inspection of printed image. On the other hand, in the case of variable printing, an image is different for every output so that a correct image cannot be prepared in advance. Therefore, in this case, the image forming image data and the read image data are compared.

The Image forming image data have output resolutions of CMYK which are toner colors. On the other hand, since the printed image is subjected to halftone processing such as screen processing and further printed, the edge portion is usually blurred as compared with the image forming image data. Moreover, by reading these printing results with the reading unit, the printing results become image data in RGB format, and the resolution also depends on the scan setting of the reading unit. In order to compare images with considerably different characteristics in this manner, various processings such as color matching, resolution conversion and filter blurring processing are performed for the comparison. When these processings are executed by software, the degree of freedom is high, but the processing time is long. On the other hand, when these processings are executed by hardware, the costs increase. Furthermore, there may be a case that, due to factors such as different color tones depending on the type of paper even after the processings, it is impossible to perform the conversion into completely the same characteristics for the comparison and expect high precision.

Therefore, it is difficult to efficiently and accurately inspect printed images when the images are formed on printed matter of a plurality of sheets with different contents by using different image forming image data even by using any one of the technologies described above in JP 2014-134401 A, JP 2013-197860 A, JP 2013-179546 A and JP 2012-000876 A.

SUMMARY

An object of the present invention is to realize an inspection apparatus and an inspection program capable of efficiently and accurately performing inspection even when images are formed on printed matter of a plurality of sheets with different contents by using different image forming image data.

To achieve the abovementioned object, according to an aspect of the present invention, an inspection apparatus for inspecting printed matter on which an image is formed, reflecting one aspect of the present invention comprises: a region extractor that extracts a first region, in which a character is formed, and a second region, in which the character is not formed, with reference to image forming image data used to form the image; and a defect detector that detects a defect in the first region and a defect in the second region in read image data obtained by reading the printed matter on which the image is formed by the image forming image data, wherein the defect detector includes: a first region defect detector that detects loss of a dot in the first region in the read image data; and a second region defect detector that detects presence of a dot with a density equal to or greater than a predetermined density in the second region in the read image data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 8 is an explanatory diagram for explaining processings of the embodiment of the present invention;

FIGS. 10A to 10D are explanatory diagrams for explaining processings of the embodiment of the present invention.

DETAILED DESCRIPTION OF EMBODIMENTS

Figure 1:
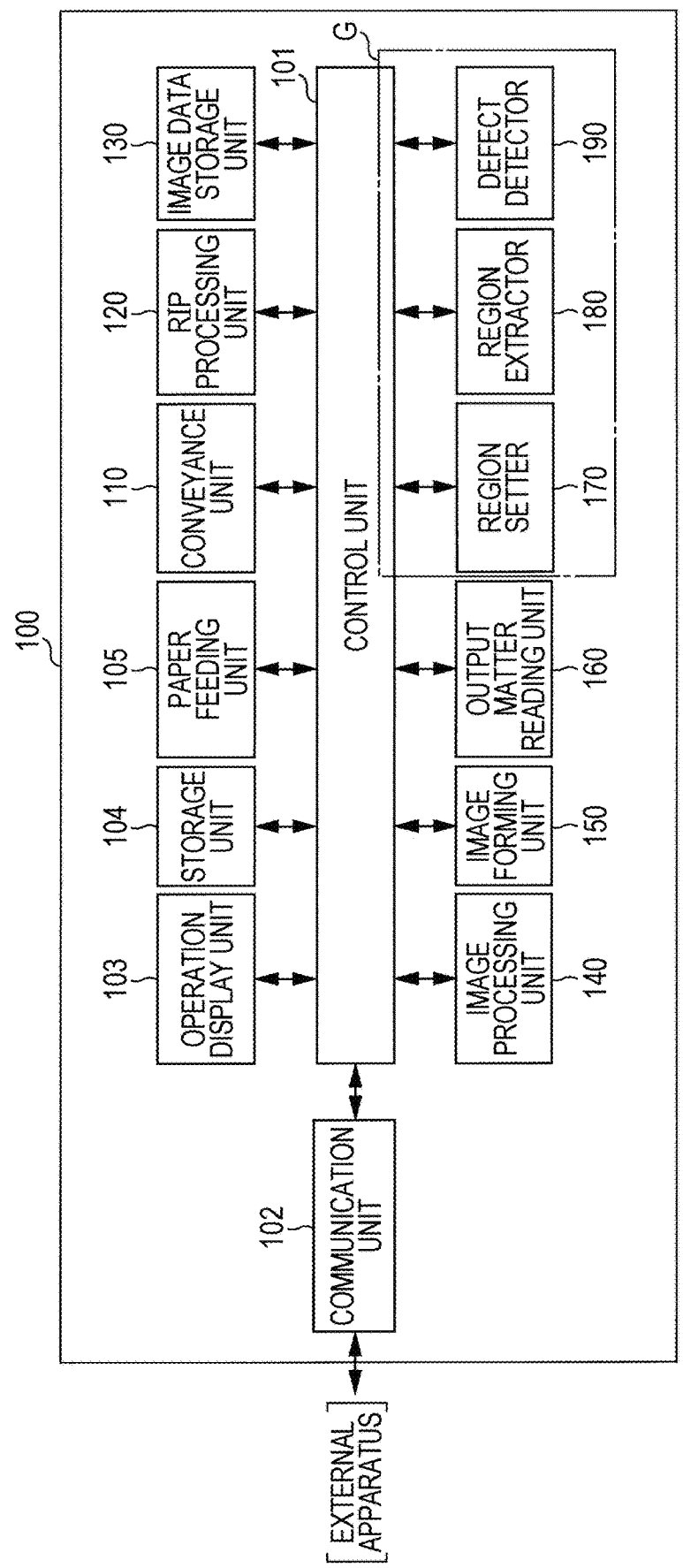
FIG. 1 is a configuration diagram illustrating a configuration of an embodiment of the present invention.

Hereinafter, one or more embodiments, in which printed matter can be efficiently and accurately inspected when an image is formed on the printed matter of a plurality of sheets with different contents, of the present invention will be described in detail with reference to the drawings. However, the scope of the invention is not limited to the disclosed embodiments.

[Configuration (1)]

Herein, a configuration example of an image forming apparatus 100 including an inspection apparatus will be described in detail based on FIGS. 1 and 2. With these FIGS. 1 and 2, the image forming apparatus 100 incorporated with an output matter reading unit will be described.

Herein, the image forming apparatus 100 is configured by including a control unit 101 (such as a hardware processor), a communication unit 102, an operation display unit 103, a storage unit 104, a paper feeding unit 105, a conveyance unit 110, a RIP processing unit 120, an image data storage unit 130, an image processing unit 140, an image forming unit 150, an output matter reading unit 160, a region setter 170, a region extractor 180 and a defect detector 190.

Then, the control unit 101 controls each unit in the image forming apparatus 100 according to a control program. Note that, in the present embodiment, the control unit 101 serves as a control unit of the inspection apparatus to control inspection of the image according to an inspection program. The communication unit 102 communicates between the image forming apparatus 100 and other apparatuses (not illustrated). The operation display unit 103 receives operation input by a user and displays the status of the image forming apparatus 100. The storage unit 104 is configured with a nonvolatile memory and stores various settings. The paper feeding unit 105 feeds sheets accommodated in a paper feeding tray according to the timing of forming the image. The conveyance unit 110 conveys the sheet within the apparatus according to the timing of forming the image. The RIP processing unit 120 generates RIP image data (image forming image data) according to toner colors in the bitmap format by performing RIP processing on print data in a page description language format. The image data storage unit 130 stores the image forming image data and various data for the image to be formed. The image processing unit 140 executes various image processings, which are necessary to form the image, on the image forming image data. The image forming unit 150 forms the image on the sheet based on an image forming command and the image forming image data. The output matter reading unit 160 reads the image formed on the sheet and generates read image data. The region setter 170 sets a fixed region, in which the image is formed on the printed matter of the plurality of sheets with the same contents by using the same image forming image data, and a variable region, in which the image formed on the printed matter of the plurality of sheets with different contents by using different image forming image data, by information included in the image forming image data or designation by the user. In the above variable region, the region extractor 180 extracts a first region (hereinafter referred to as a "character region"), in which a character is formed, and a second region, in which none of the character, line and painting are formed (hereinafter referred to as "background region"). The defect detector 190 detects a defect by comparing the read image data of the printed matter of the plurality of sheets with the image forming image data or detects a defect by comparing the read image data of the printed matter of the plurality of sheets with reference read image data prepared in advance in the fixed region, and detects a defect by loss of a dot or presence of a dot in the read image data for the real image data of the printed matter of the plurality of sheets in the variable region.

Figure 2:
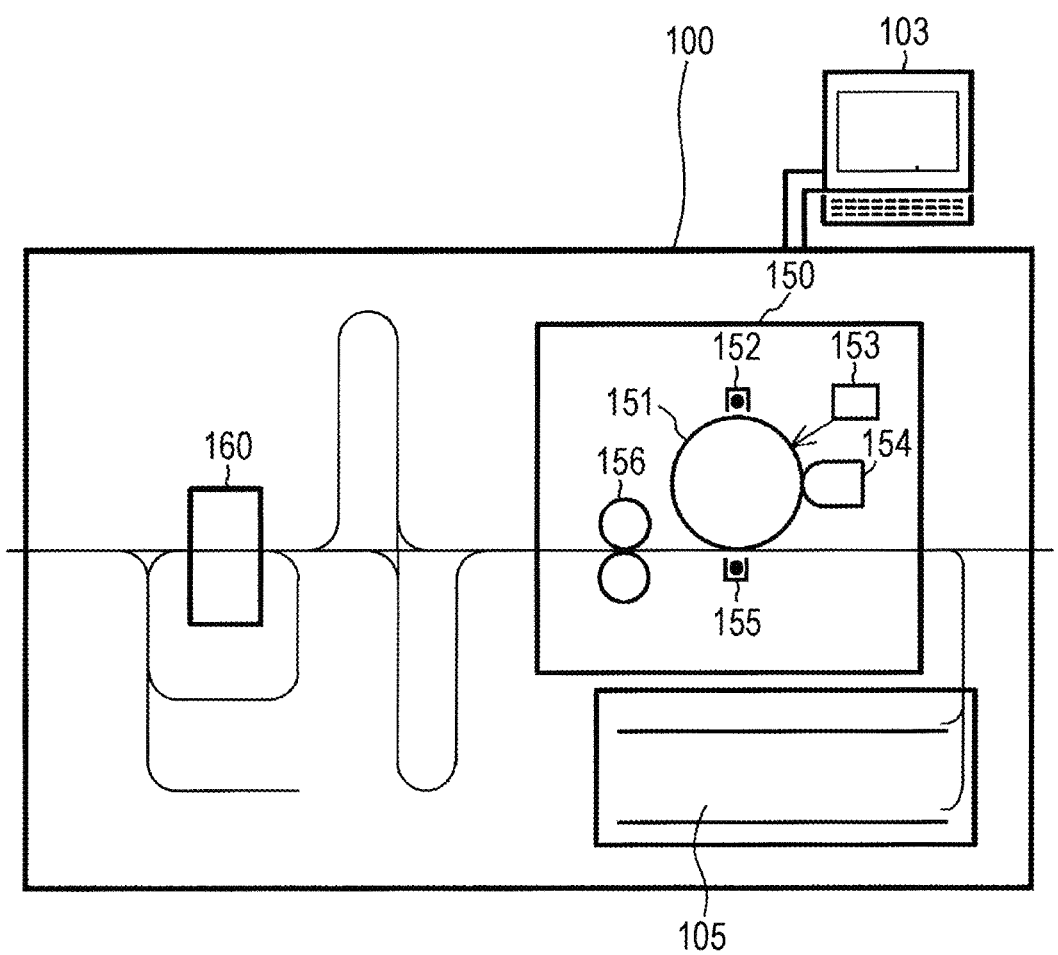
FIG. 2 is a configuration diagram illustrating a configuration of the embodiment of the present invention.

Herein, as illustrated in FIG. 2, the image forming unit 150 is configured by having an image carrier 151, a charging unit 152, an exposure unit 153, a development unit 154, a transfer unit 155 and a fixing unit 156. Herein, a toner image is formed on the image carrier 151 as described later. The charging unit 152 charges the image carrier 151 with a predetermined potential. The exposure unit 153 forms an electrostatic latent image by exposing the charged image carrier 151 according to the image forming image data. The development unit 154 develops and converts the electrostatic latent image into the toner image. The transfer unit 155 transfers the toner image on the image carrier 151 to the sheet. The fixing unit 156 makes the toner image on the sheet stable by heat and pressure. Note that this configuration of the image forming unit 150 is one example and may form a multicolor image by using an intermediate transfer body. Moreover, the image forming unit 150 may be configured to turn over the sheet to form the image on both sides of the sheet.

Note that the output matter reading unit 160 is disposed on the downstream side of the sheet conveyance direction of the image forming unit 150 and is configured to read the image on the outputted sheet during the conveyance. Note that the output matter reading unit 160 may read one side of the sheet or may read both sides of the sheet at once. Moreover, when the output matter reading unit 160 is the one which reads one side, it is also possible to read both sides of the sheet by turning over the sheet.

Note that an inspection apparatus G can be configured with the control unit 101, the region setter 170, the region extractor 180 and the defect detector 190. Although FIG. 1 illustrates that the inspection apparatus G is incorporated in the image forming apparatus 100, the inspection apparatus G may be an inspection apparatus independent of the image forming apparatus 100. Furthermore, an off-line type inspection apparatus G which is not connected to the image forming apparatus 100 can be configured with the control unit 101, the output matter reading unit 160, the region setter 170, the region extractor 180 and the defect detector 190.

[Configuration (2)]

Herein, a configuration example of an image forming system 1 including an inspection apparatus will be described in detail based on FIGS. 3 and 4. With these FIGS. 3 and 4, the image forming system 1 having a paper feeding apparatus 50, an image forming apparatus 100 and a reading apparatus 200 will be described.

Herein, the image forming apparatus 100 is similar to that illustrated in FIGS. 1 and 2 but has no output matter reading unit. Moreover, the image forming system 1 may be configured to also use an output matter reading unit in the reading apparatus 200 although the image forming apparatus 100 has an output matter reading unit. Note that the same numerals are given to the same items in FIGS. 1 and 2 and FIGS. 3 and 4, and redundant descriptions are omitted.

Herein, the reading apparatus 200 is disposed on the downstream side of the sheet conveyance direction of the image forming apparatus 100. The reading apparatus 200 is configured by having a communication unit 202 and an output matter reading unit 260 and is configured to read the image on the outputted sheet during the conveyance.

Note that this reading apparatus 200 may be configured to have the output matter reading unit 260 in a post-processing apparatus having a post-processing unit (not illustrated) as a post unit of the image forming apparatus 100.

Figure 3:
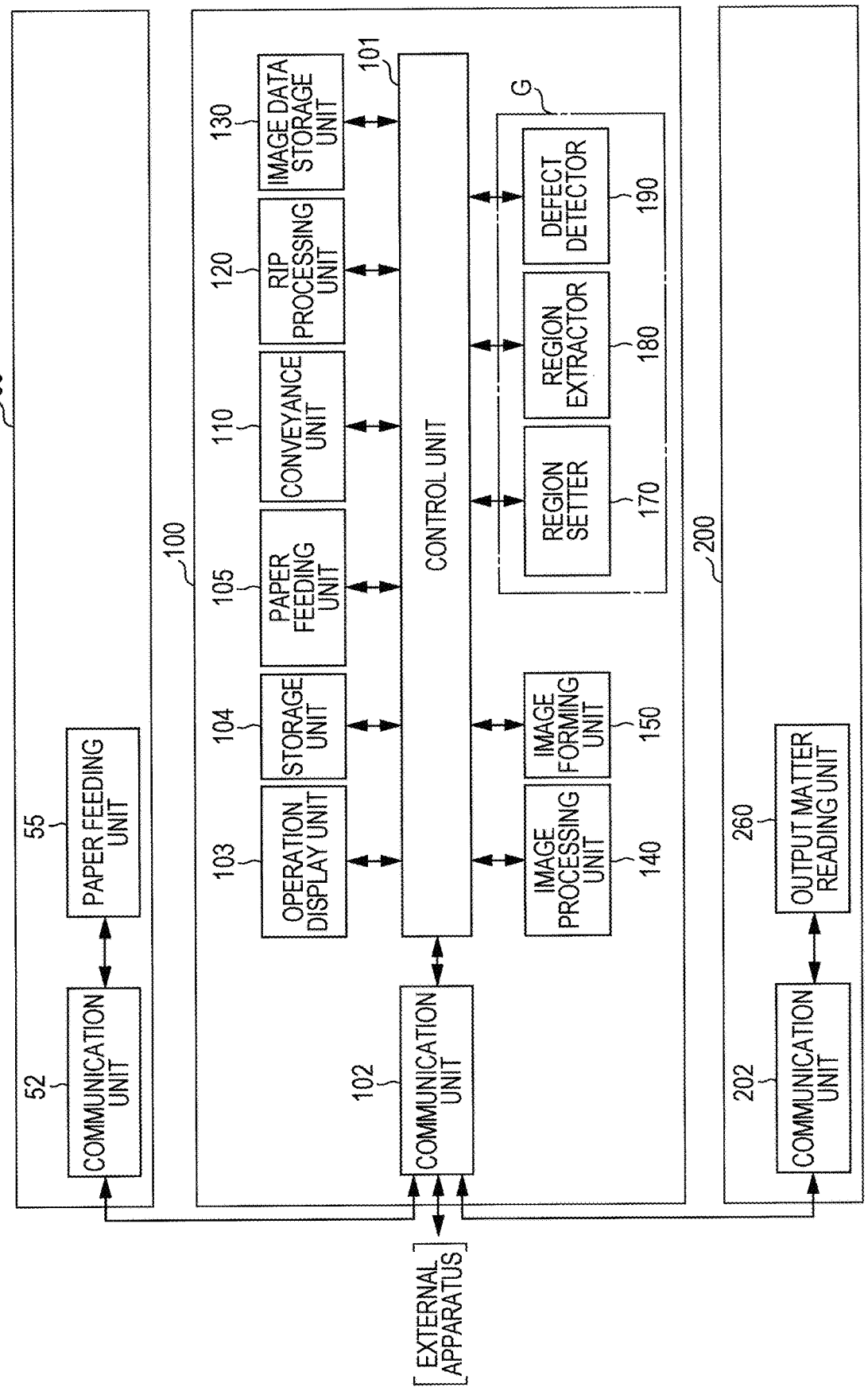
FIG. 3 is a configuration diagram illustrating a configuration of an embodiment of the present invention.
Figure 4:
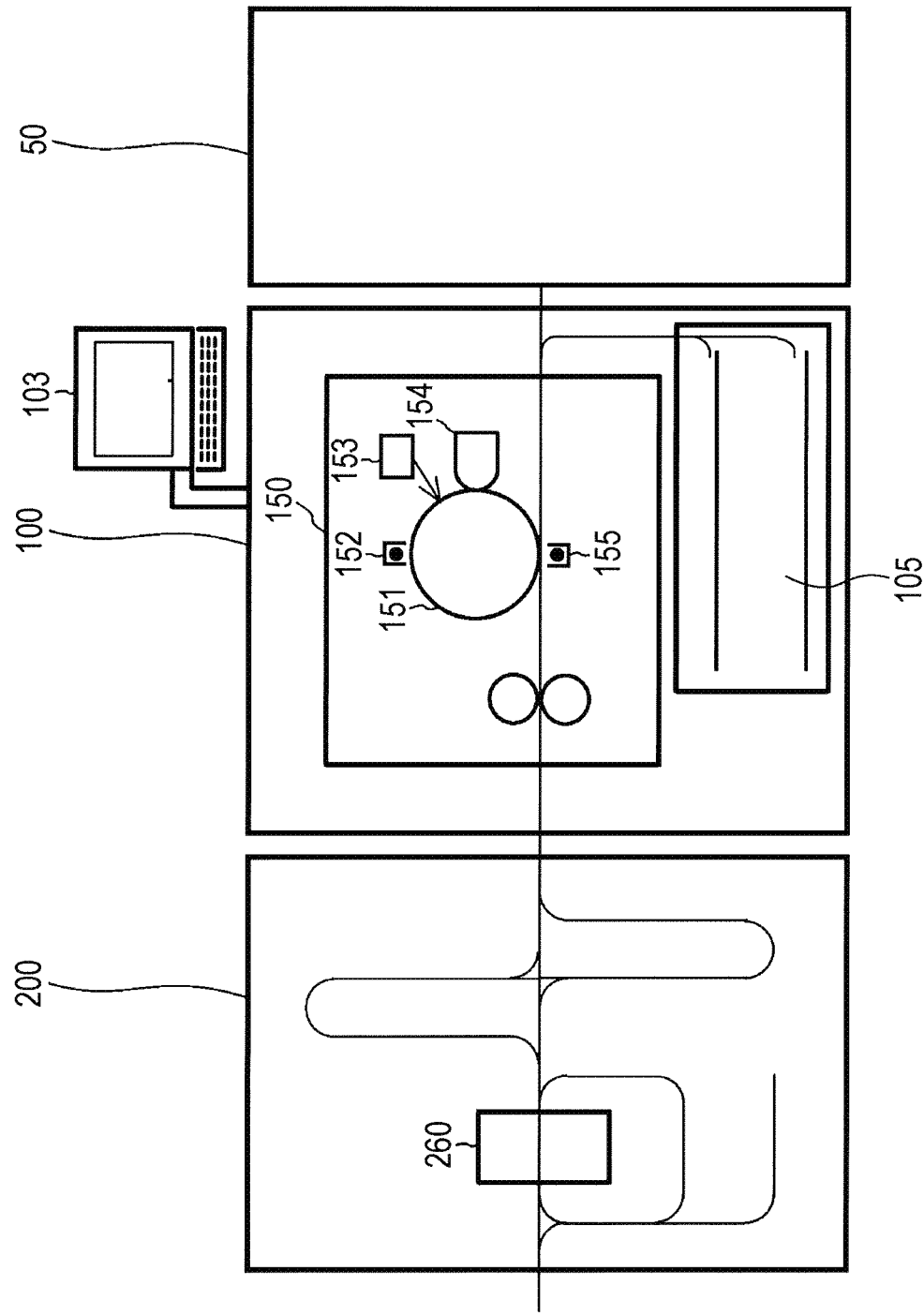
FIG. 4 is a configuration diagram illustrating a configuration of the embodiment of the present invention.

Note that the output matter reading unit 160 in FIGS. 1 and 2 and the output matter reading unit 260 in FIGS. 3 and 4 have line sensor type imaging elements whose longitudinal direction is a direction orthogonal to the sheet conveyance direction so that it becomes possible to read during the conveyance the image on the sheet outputted after the image is formed.

[Operation]

Hereinafter, the operation of the inspection apparatus will be described by explaining the operation of the image forming apparatus 100 with reference to the flowcharts and various explanatory diagrams. Note that the operation of the inspection apparatus is realized by the inspection program. Note that the operation of the image forming apparatus 100 incorporated with the output matter reading unit 160 is taken as a specific example herein, and the operation of the image forming system 1 is also substantially the same.

At the start of forming an image, the control unit 101 sets or initializes each unit in the image forming apparatus 100 according to an image forming mode of a job to be executed. Moreover, the control unit 101 acquires a correct image (see FIG. 5) for the job to be executed before the start of forming the image.

Figure 5:
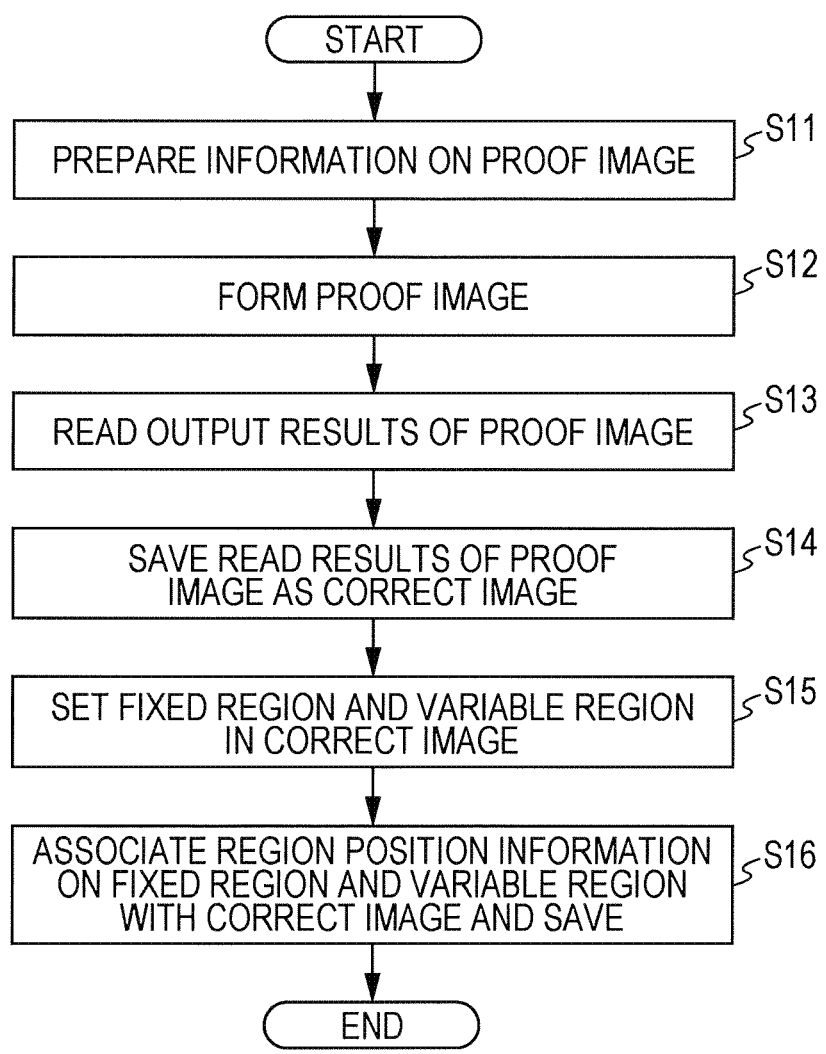
FIG. 5 is a flowchart illustrating the operation of the embodiment of the present invention.

The control unit 101 prepares information on a proof image (step S11 in FIG. 5) and forms the proof image (step S12 in FIG. 5). Herein, the proof image is an image used to execute proof printing as trial printing before the image is actually formed and is an image substantially the same as an image used to actually form the image.

After this proof image is formed, the control unit 101 controls the output matter reading unit 160 to execute the reading (step S13 in FIG. 5) and controls the image data storage unit 130 to save the read image acquired by the reading as the read image data (hereinafter referred to as "reference read image data) of the correct image (step S14 in FIG. 5).

Herein, the region setter 170 received the instruction from the control unit 101 sets, in the correct image, the fixed region, in which the image is formed on the printed matter of the plurality of sheets with the same contents by using the same image forming image data, and the variable region, in which the image is formed on the printed matter of the plurality of sheets with different contents by using different image forming image data (step S15 in FIG. 5).

Figure 6:
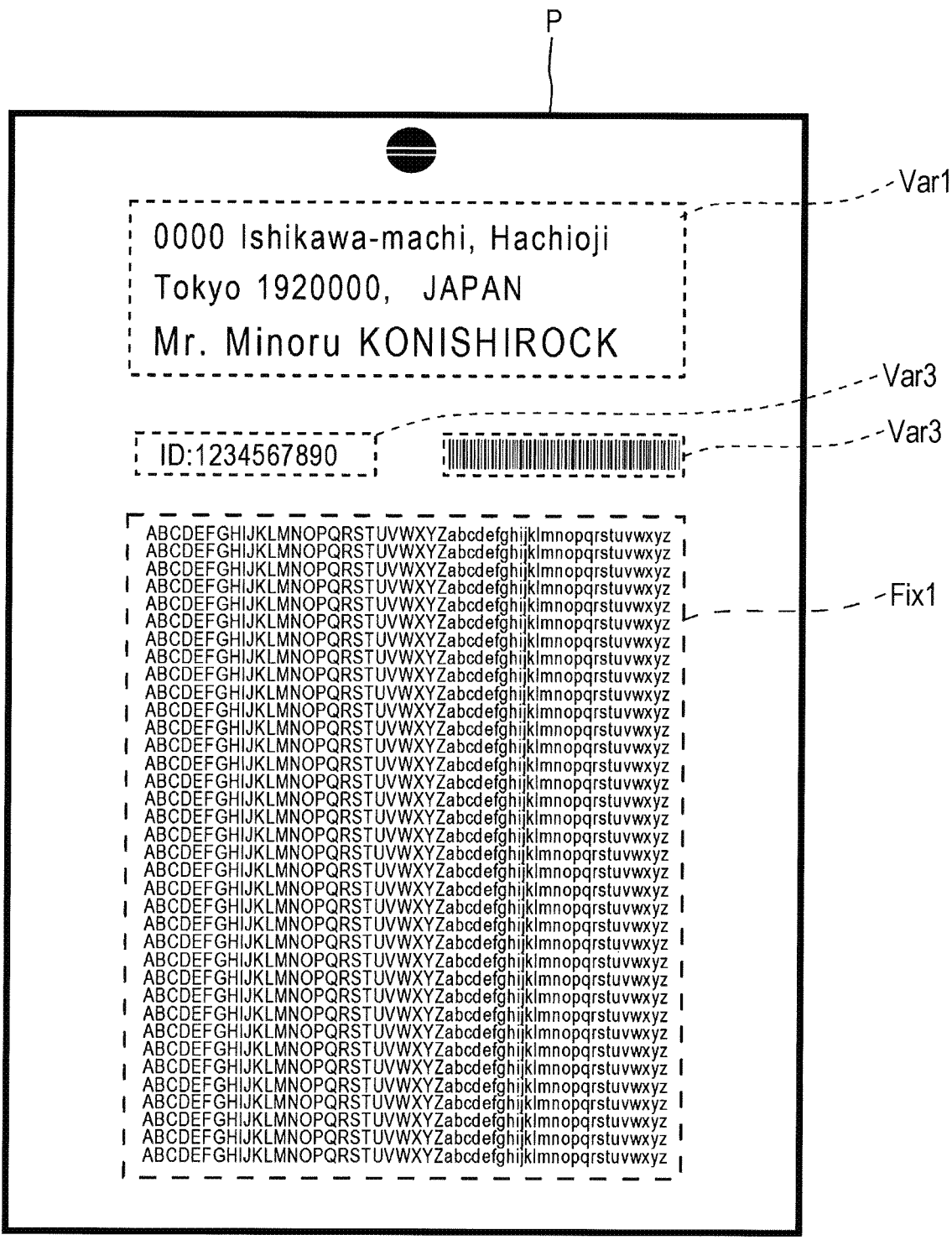
FIG. 6 is an explanatory diagram for explaining processings of the embodiment of the present invention.

Note that the fixed region and the variable region will be described with reference to FIG. 6. For example, in a printing method called "variable printing", as illustrated in FIG. 6, when an image is formed on printed matter of a plurality of sheets, most of the image such as a main body is made common to be the fixed region (Fix1 in FIG. 6) and only a part of the image such as an address is changed to be the variable regions (Var1, Var2 and Var3 in FIG. 6) to be printed. In the example illustrated in FIG. 6, the main body is the fixed region Fix1, the address is the variable region Var1, the address ID is the variable region Var2, and the barcode display of the address and ID is the variable region Var3.

Note that the region setter 170 may extract and set the distinction between the fixed region and the variable region from the job data or may display the correct image on the operation display unit 103 to set the distinction between the fixed region and the variable region by the instruction from the user. Then, the region setter 170 associates region position information on the fixed region and the variable region with the above correct image and saves the region position information in the image data storage unit 130 (step S16 in FIG. 5).

Figure 7A:
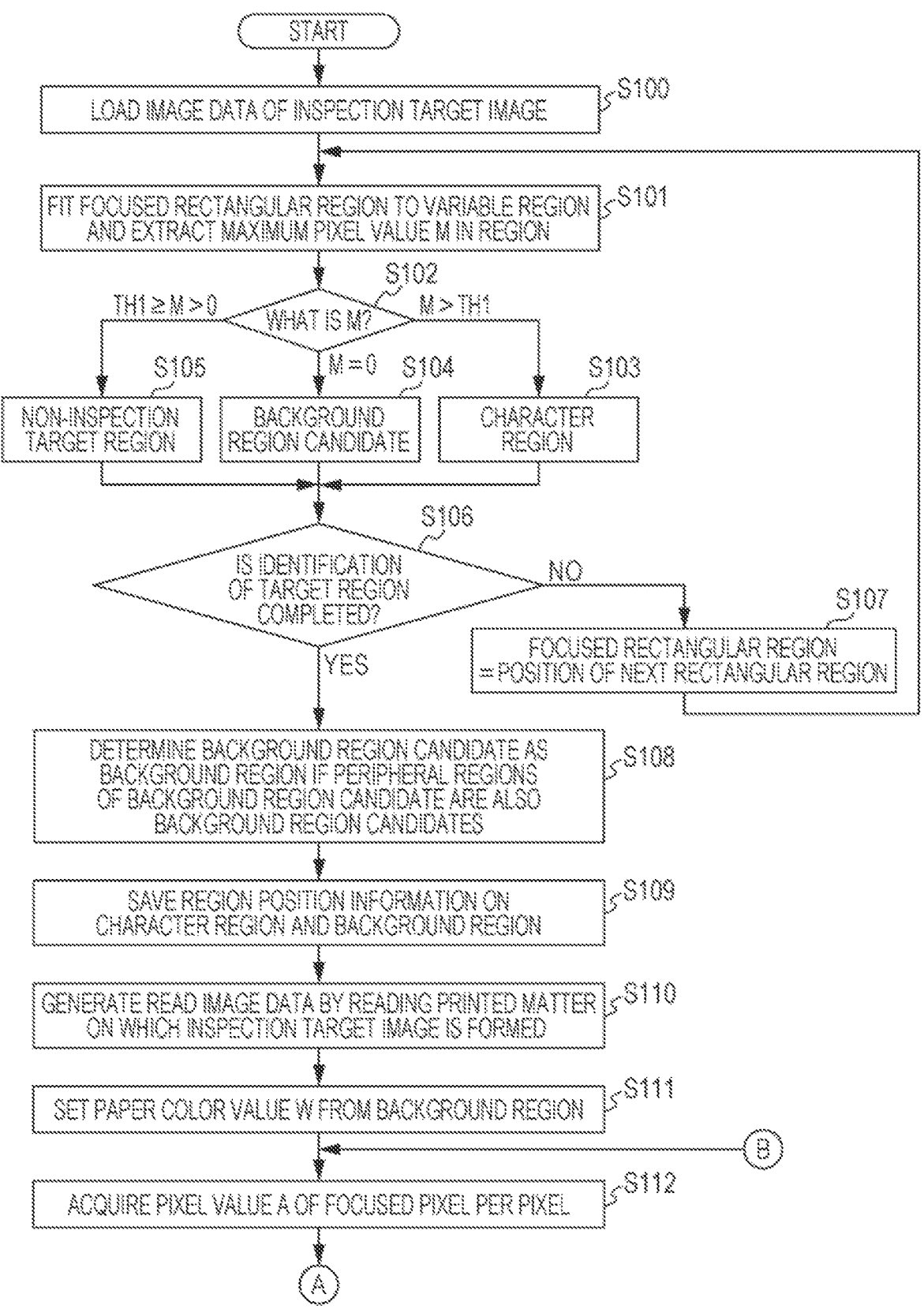
FIGS. 7A to 7B are a flowchart illustrating the operation of the embodiment of the present invention.

After completion of setting the fixed region and the variable region based on the correct image by the region setter 170, the control unit 101 loads the image forming image data of the image to be actually formed (inspection target image) from a print preparation memory in the image data storage unit 130 (step S100 in FIG. 7A).

Note that, the feature of the present embodiment is that, as will be described later, it is unnecessary to compare, upon the inspection, image data of before and after the image is formed by detecting the loss (absence of dot) in the character region in the variable region and detecting defacement (presence of dot) in the background region in the variable region in the read image data of the formed inspection target image. Thus, the character region and the background region in the variable region of the inspection target image are identified based on the image forming image data as follows.

To identify the character region, background region and non-inspection target region, which is neither the character region nor the background region, in the set variable region, the region extractor 180 received the instruction from the control unit 101 moves and fits a focused rectangular region against and to the variable region of the image forming image data of the inspection target image and extracts a maximum pixel value M included in that focused rectangular region (step S101 in FIG. 7A).

Note that the reason that the focused rectangular region of a plurality of pixels×a plurality of pixels is used instead of performing identification for each pixel is to distinguish bleeding of the character due to toner scattering or the like around the character from the defacement. Thereupon, in consideration of the size of the entire image, the size of the character, and the like, for example, a focused rectangular region of 8×8 pixels is moved by every one pixel in the variable region of the image forming image data of the inspection target image while being fitted, and the maximum pixel value M included in the focused rectangular region is extracted.

Herein, the region extractor 180 compares the extracted maximum pixel value M with a predetermined threshold value TH1 (step S102 in FIG. 7A). Note that the threshold value TH1 herein is used to identify the character, the background and the non-inspection target (e.g., a halftone image). Note that is also possible to identify the type of the region in the variable region with reference to a minimum pixel value. However, since the minimum value of the character region including even a small portion of the background is 0 and the character region does not become the character image, the possibility that the character image does not become the inspection target region becomes high in the case of a small character. Therefore, better results can be obtained by using the maximum pixel value.

Thereupon, as illustrated in the table in FIG. 8, when each toner color of Y, M, C and K takes a value of 0 to 255, the output gradation of the character image is normally set to be darker in most cases, so TH1 is set to about 200 or 250. If M>TH1, the region has a black character or a black line and is identified as the character region (S103, when M>TH1 in step S102 in FIG. 7A). If M=0 in each color, the region is identified as a background region candidate (S104, when M=0 in step S102 in FIG. 7A). If the region is a halftone image other than the character region and the background region, the region is identified as the non-inspection target region (S105, when TH1≥M>0 in step S102 in FIG. 7A). Thus, it is possible to identify the region by comparing M in the focused rectangular region with the threshold value TH1. Note that, in the case of FIG. 8, a color character other than the black character is also the non-inspection target, but it is also possible to perform the inspection by identifying the color character as the character region.

As described above, by moving the focused rectangular region by every one pixel in the variable region of the image forming image data of the inspection target image while being fitted and extracting the maximum pixel value M included in the focused rectangular region, the region extractor 180 identifies the type of the inspection target region for the entire variable region (steps S106 and S107 in FIG. 7A).

Figure 9A:
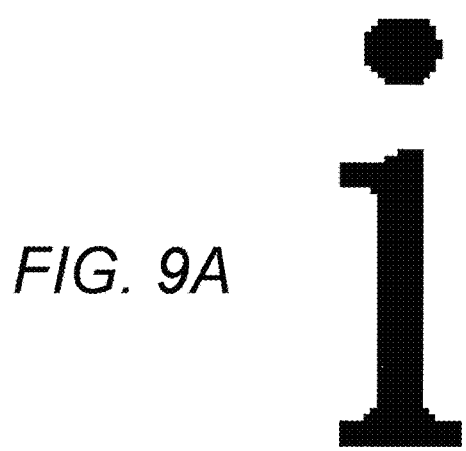
FIGS. 9A to 9D are explanatory diagrams for explaining processings of the embodiment of the present invention.
Figure 9B:
Figure 9C:
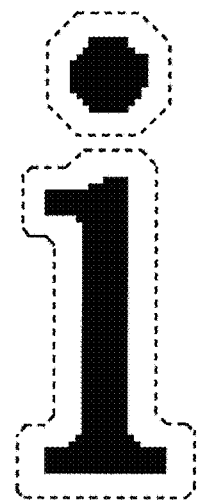
Figure 9D:
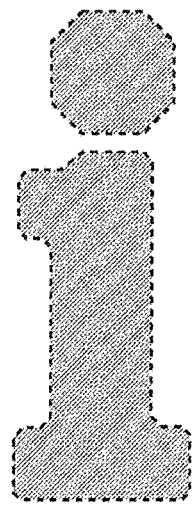

FIG. 9A illustrates one example of the inspection target image. Herein, the alphabet "i" is illustrated as a specific example. Furthermore, FIG. 9B illustrates the focused rectangular region of the plurality of pixels described above. Then, the focused rectangular region in FIG. 9B is fitted to the inspection target image in FIG. 9A, and a region with M>TH1 even in one pixel in the focused rectangular region is identified as the character region. Therefore, the character regions are expanded to the outside of the character as indicated by the broken lines in FIG. 9C. Herein, when the focused rectangular region of 8×8 pixels is used, expansion of seven pixels is made to the outside of the character. Note that the regions indicated by hatching inside the broken lines in FIG. 9D are the character regions for the character in FIG. 9A.

Figure 10A:
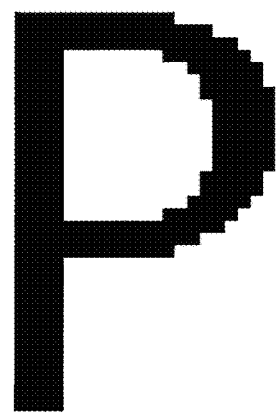
Figure 10C:
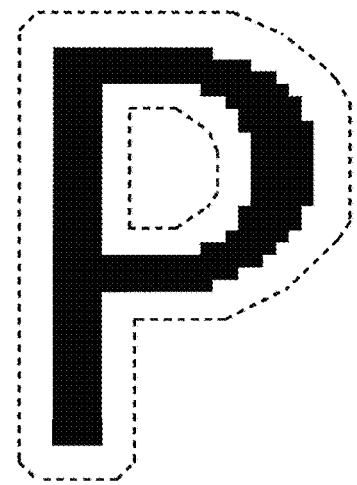
Figure 10D:
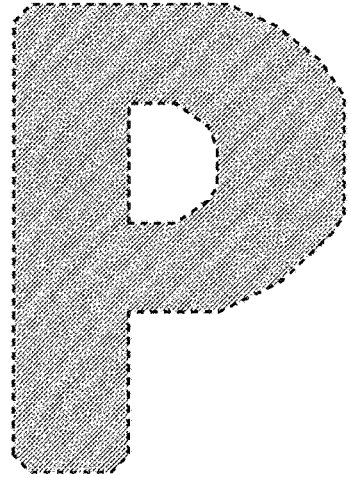

FIG. 10A illustrates another example of the inspection target image. Herein, the alphabet "P" is illustrated as a specific example. Furthermore, FIG. 10B illustrates the focused rectangular region of the plurality of pixels described above. Then, the focused rectangular region in FIG. 10B is fitted to the inspection target image in FIG. 10A, and a region with M>TH1 even in one pixel in the focused rectangular region is identified as the character region. Therefore, the character region is expanded to the outside of the character and to the inside of a loop of P as indicated by the broken lines in FIG. 10C. Herein, when the focused rectangular region of 8×8 pixels is used, expansion of seven pixels is made to the outside and inside of the character. Note that the region indicated by hatching and surrounded by broken lines in FIG. 10D is the character region for the character in FIG. 10A.

Moreover, as described above, there are cases where the bleeding of the character image is present near the edges of the character region due to printing and the character image is present in an image region with nothing due to distortion at the time of printing. Thus, it is necessary to have a certain amount of margin. Thereupon, for the background region candidate identified as described above (step S104 in FIG. 7A), when the maximum value=0 in the focused rectangular region and L number of the focused rectangular regions therearound (when the peripheral regions are also the background region candidates), the focused rectangular region which is the background region candidate is decided as the background region (step S108 in FIG. 7A).

After the character region and the background region are identified in the variable region in the inspection target image as described above, the region extractor 180 saves the region position information on the character region and the background region in the image data storage unit 130 (step S109 in FIG. 7A).

Then, after the region extractor 180 identifies the character region and the background region in the variable region based on the image forming image data of the inspection target image (steps S101 to S109 in FIG. 7A), the control unit 101 controls the output matter reading unit 160 to generate the read image data (hereinafter referred to as "read image data of the inspection target image") by reading the printed matter on which the inspection target image is formed by the image forming unit 150 (step S110 in FIG. 7A).

Herein, the defect detector 190 received the instruction from the control unit 101 performs various filter processings on the read image data of the inspection target image in a set background region portion and acquires a paper color value W as the color of the sheet (step S111 in FIG. 7A). Herein, by performing filter processings such as median filter processing and moving average filter processing on the background region portion of the read image data of the inspection target image, it is possible to remove noise components and acquire the paper color value W as the color of the sheet used to form the image. Note that filter processings other than the median filter processing and the moving average filter processing can also be used as the filter processings.

Moreover, the paper color value W can be acquired by performing the filter processings not only on the background region but also on the entire variable region or the entire sheet. Since the area of the paper surface without the character is larger than the area of the character dots occupying on the paper surface, it is possible to acquire a value close to the paper color even when the filter processings are performed on the entire region.

Figure 7B:
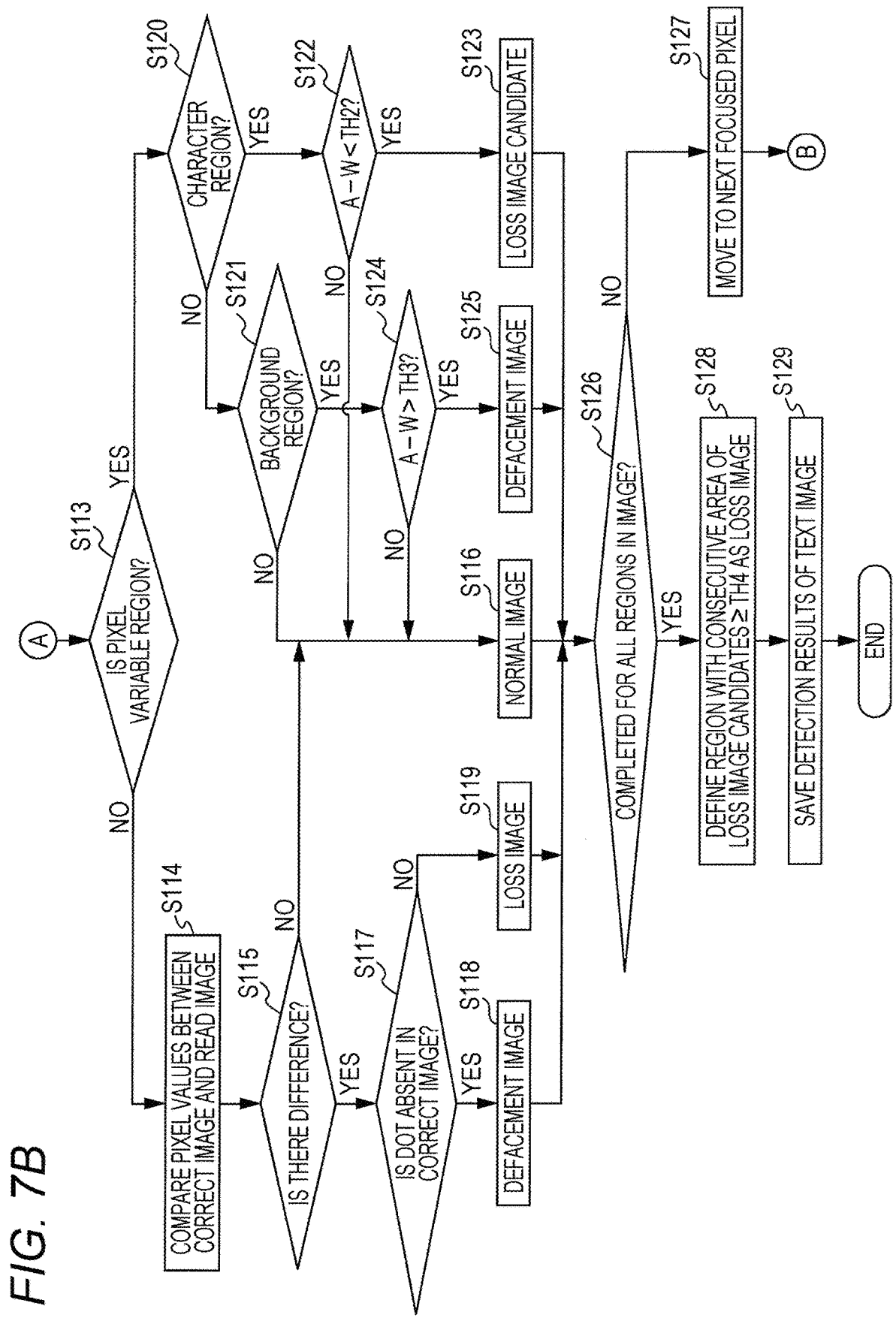

Furthermore, the defect detector 190 acquires a pixel value A of a focused pixel per pixel for all the regions in the read image data of the inspection target image and executes the following defect detection processings (steps S112 to S127 in FIGS. 7A and 7B).

Herein, the defect detector 190 determines whether the focused pixel with the acquired pixel value A is the variable region or the background region with reference to the region position information (step S113 in FIG. 7B). If the focused pixel is determined as the fixed region (NO in step S113 in FIG. 7B), the defect detector 190 compares the pixel value A with a pixel value of a pixel corresponding to the focused pixel between the reference read image data saved in the image data storage unit 130 and the read image data of the inspection target image (step S114 in FIG. 7B).

If there is no difference between the pixel value as a result of the comparison (NO in step S115 in FIG. 7B), the defect detector 190 determines that the focused pixel of the read image data of the inspection target image belongs to a normal image (step S116 in FIG. 7B). On the other hand, if there is a difference between the pixel values as a result of the comparison (YES in step S115 in FIG. 7B) and a dot is not present in the correct image (YES in step S117 in FIG. 7B), the defect detector 190 determines that the focused pixel of the read image data of the inspection target image belongs to a defacement image (step S118 in FIG. 7B). Furthermore, if there is a difference between the pixel values as a result of the comparison (YES in step S115 in FIG. 7B) and a dot is present in the correct image (NO in step S117 in FIG. 7B), the defect detector 190 determines that the focused pixel of the read image data of the inspection target image belongs to a loss image (step S119 in FIG. 7B).

After the presence or absence of the defect of the focused pixel in the fixed region is detected by the determinations described above (steps S116, S118 and S119 in FIG. 7B), the defect detector 190 moves to a next focused pixel and perform the same processings so as to detect the presence or absence of the defect of the focused pixel for all the regions in the read image data of the inspection target image (step S127 in FIG. 7B). Note that, since the focused pixel belongs to the fixed region in the above case, it is possible to easily compare the focused pixel of the read image data of the inspection target image with the corresponding pixel of the reference read image data prepared in advance.

On the other hand, the defect detector 190 determines whether the focused pixel with the acquired pixel value A is the variable region or the background region with reference to the region position information (step S113 in FIG. 7B). If the focused pixel is determined as the variable region (YES in step S113 in FIG. 7B), the defect detector 190 detects whether the focused pixel is normal, the defacement, or a loss candidate by comparing the pixel value A with the threshold value (steps S122 and S124 in FIG. 7B) depending on whether the focused pixel is the character region or the background region (steps S120 and S121 in FIG. 7B).

That is, if the focused pixel is the character region in the variable region (YES in step S113 and YES in step S120 in FIG. 7B) and a difference A−W between the pixel value A of the focused pixel and the paper color value W is less than a threshold value TH2 (YES in step S122 in FIG. 7B), the defect detector 190 determines that the focused pixel is a loss image candidate in which a dot constituting the character is lost (step S123 in FIG. 7B). If the difference A−W between the pixel value A of the focused pixel and the paper color value W is equal to or greater than the threshold value TH2 (NO in step S122 in FIG. 7B), the defect detector 190 determines that the focused pixel is the normal image in which the dot constituting the character is not lost (step S116 in FIG. 7B).

Note that, by setting the threshold value TH2 to any value between the density of the character and the paper color value, for example, a value about 50% of a case where the maximum value of the density of the character is set to 100%, it is possible to perform secure determination. Moreover, the threshold value TH2 may be any value close to the paper color value (minimum value). For example, by setting the threshold value TH2 to a value of about 5% or 10% close to the paper color value in a case where the maximum value of the density of the character is set to 100% and the paper color value is set to 0%, it is possible to accurately determine the loss of the character.

Furthermore, when the paper color value W is calculated by averaging the entire sheet or the entire variable region in step S111, it is also possible to directly apply the paper color value W to this threshold value TH2.

Further, if the focused pixel is the background region in the variable region (YES in step S113, NO in step S120 and YES in step S121 in FIG. 7B) and the difference A−W between the pixel value A of the focused pixel and the paper color value W is greater than a threshold value TH3 (YES in step S124 in FIG. 7B), the defect detector 190 determines that the focused pixel is a defacement image in which some density (defacement) is present in the background (step S125 in FIG. 7B). If the difference A−W between the pixel value A of the focused pixel and the paper color value W is equal to or less than the threshold value TH3 (NO in step S124 in FIG. 7B), the defect detector 190 determines that the focused pixel is the normal image in which a stain is not attached to the background (step S116 in FIG. 7B). Note that the threshold value TH3 may be any value capable of distinguishing visually recognizable defacement from a normal background. For example, by setting the threshold value TH3 to a value about 50% or 25% of a case where the maximum value of the density of the character is set to 100%, it is possible to perform secure determination. Note that, if this threshold value TH3 is small, it is possible to strictly check the defacement.

Moreover, if the focused pixel in the variable region is neither the character region nor the background region in the variable region (YES in step S113, NO in step S120 and NO in step S121 in FIG. 7B), the defect detector 190 determines that the focused pixel is the normal image since the loss of the character and the defacement of the background are not present (step S116 in FIG. 7B).

Note that, to detect the defect by the defect detector 190 as described above, a character region defect detector for detecting a defect in the character region and a background region defect detector for detecting a defect in the background region may be provided in the defect detector 190.

After the presence or absence of the defect of the focused pixel in the variable region is detected by the determinations described above (steps S116, S123 and S125 in FIG. 7B), the defect detector 190 moves to a next focused pixel and perform the same processings so as to detect the presence or absence of the defect of the focused pixel for all the regions in the read image data of the inspection target image (step S127 in FIG. 7B).

Note that the character region is expanded to include the periphery of the character as indicated by the broken lines in FIGS. 9A to 9D and FIGS. 10A to 10D as described above so as not to erroneously detect the bleeding of the character as the defacement of the background. Therefore, a case where s dot is not present even in one pixel of the character region is not defined as the loss image but set as the loss image candidate, and a case a series of loss image candidates are present in a large number of pixels (area) with values equal to or greater than a threshold value TH4 is decided as the loss image in the character region (step S128 in FIG. 7B). Herein, since the threshold value TH4 depends on the size of the character desired to be decided as the loss image, a size changing parameter is prepared. For example, when the loss of only the upper point portion of the character "i" in FIG. 9A is desired to be detected, the threshold value TH4 is set to be smaller according to the number of pixels in the upper point portion in FIG. 9D. When the loss of the entire character "i" in FIG. 9A is desired to be detected, the desired loss can be detected by setting the threshold value TH4 to be greater according to the total number of pixels in FIG. 9D. Moreover, the threshold value TH4 is desired to be changed according to the size of the character (number of points) in conjunction for both cases of the portion of the character and the entire character.

As described above, after the defect detection is completed for the entire character region and background region in the variable region in the inspection target image, the defect detector 190 saves the detection results in the image data storage unit 130 as well as notifies the control unit 101 (step S129 in FIG. 7B).

Note that the control unit 101 received the defect detection results changes a discharge tray of the sheet with the inspection target image, informs the operation display unit 103 of the abnormality and performs various other controls when the inspection target image is determined to be a defect.

Note that, when the focused pixel is the variable region as described above, the corresponding pixels of the reference read image data or the image forming image data and the read image data of the inspection target image are not compared with each other, but only the pixel values of the read image data of the inspection target image are compared with the threshold values. Thus, it is possible to efficiently and accurately perform the inspection with less computations.

Also at this time, since the character region and the background region in the variable region are identified by the pixel values, it is possible to accurately identify each region at high speed.

Also at this time, by detecting a pixel with a density is equal to that of the background region in the read image data as the defect due to the loss, it is possible to accurately detect the defect of the loss of the character in the character region.

Moreover, by detecting the loss of a predetermined number or more of consecutive dots as the defect in the character region in the variable region, it is possible to accurately detect the defect of the loss of the character in the character region.

Furthermore, by detecting a pixel having a density greater than the paper average density obtained from the read image data as the defect in the background region in the variable region, it is possible to securely detect the stain as the presence of the dot in the background region.

Other Embodiment (1)

In the above embodiments, when the region extractor 180 identifies the character region and the background region in the variable region based on the image forming image data of the inspection target image (steps S101 to S109 in FIG. 7A), by dividing the image forming image data of the inspection target image into division regions each with N pixels×N pixels, determining a predetermined pixel value in each of the division regions as a representative value of each of the division regions, collecting the representative value of each of the division regions to generate reduced image forming image data in which the image forming image data is reduced to 1/N in length and width, it is possible to identify the character region and the background region based on this reduced image forming image data. Note that the predetermined pixel value is any one of the minimum value, the maximum value, the average value, the median value, the mode or the like in each of the division regions.

The region extractor 180 identifies the character region and the background region in the variable region by using the reduced image forming image data in this manner so that the computation time can be shortened. Therefore, even when the image forming image data of the inspection target image is high definition and large in size, it is possible to deal with the data easily.

Other Embodiment (2)

In the above embodiments, the variable printing, in which the fixed region and the variable region are present, has been taken as a specific example. Herein, it is possible to obtain good results by applying the present embodiment to image data in which the entire image is equivalent to the variable region without the presence of the fixed region. In this case, the processings illustrated in FIG. 5 and the processings in step S113, step S114, step S115, step S116, step S118 and step S119 in FIG. 7B are omitted. Then, also in such a case, it is possible to detect the defects in the character region and the background region only by comparing the pixel values of the read image data of the inspection target image with the threshold values and possible to efficiently and accurately perform the inspection with less computations.

Although embodiments of the present invention have been described and illustrated in detail, the disclosed embodiments are made for purposes of illustration and example only and not limitation. The scope of the present invention should be interpreted by terms of the appended claims.

What is claimed is:

1. An inspection apparatus for inspecting printed matter on which an image is formed, comprising:
   at least one hardware processor configured to:
   extract a first region, in which a character is formed, and a second region, in which the character is not formed, with reference to image data used to form the image; and
   detect a defect in the first region and a defect in the second region in read image data obtained by reading the printed matter on which the image is formed by the image data,
   wherein the at least one hardware processor is further configured to:
   detect loss of a dot in only the first region in the read image data; and
   detect presence of a dot in only the second region in the read image data.

2. The inspection apparatus according to claim 1,
   wherein the at least one hardware processor is further configured to extract a region, in which a pixel whose pixel value of at least one color constituting the image forming image data is equal to or greater than a predetermined threshold value is present, as the first region.

3. The inspection apparatus according to claim 1,
wherein the at least one hardware processor is further configured to extract a region, in which a pixel whose pixel values of all colors constituting the image forming image data are 0 is present, as the second region.

4. The inspection apparatus according to claim 3,
wherein the at least one hardware processor is further configured to extract a region, in which a marked pixel has pixel values of 0 for all the colors constituting the image forming image data and peripheral pixels of the marked pixel also have pixel values of 0 for all the colors, as the second region.

5. The inspection apparatus according to claim 1,
wherein the at least one hardware processor is further configured to detect, in the first region, a pixel with a density equal to a density of the second region in the read image data as the defect due to the loss.

6. The inspection apparatus according to claim 5,
wherein the loss of a predetermined number or more of consecutive dots as the defect in the first region.

7. The inspection apparatus according to claim 1,
wherein, in the second region, a pixel, which has a density greater than a paper average density obtained from the read image data as the defect.

8. The inspection apparatus according to claim 1,
wherein the at least one hardware processor is further configured to extract divides the image forming image data into division regions each with N pixels×N pixels, determines a predetermined pixel value in each of the division regions as a representative value of each of the division regions, collects the representative value of each of the division regions to generate reduced image forming image data in which the image forming image data is reduced to 1/N in length and width, and extracts the first region and the second region with reference to the reduced image forming image data.

9. An inspection apparatus for inspecting printed matter on which an image is formed, comprising:
at least one hardware processor configured to:
set a fixed region, in which the image is formed on a plurality of sheets with same contents by using same image data, and a variable region, in which the image is formed on the plurality of sheets with different contents by using different image data, and
detect a defect by comparing read image data of the plurality of the sheets with the image data or detect the defect by comparing the read image data of the plurality of the sheets with reference read image data prepared in advance in the fixed region, and detect the defect by loss of a dot or presence of a dot in the read image data of the plurality of the sheets in the variable region.

10. A non-transitory recording medium storing a computer readable inspection program that controls an inspection apparatus for inspecting printed matter on which an image is formed and including:
a region extractor that extracts a first region, in which a character is formed, and a second region, in which the character is not formed, with reference to image data used to form the image; and
a defect detector that detects a defect in the first region and a defect in the second region in read image data obtained by reading the printed matter on which the image is formed by the image data,
the program causing a computer of the inspection apparatus to function such that the defect detector detects loss of a dot in only the first region in the read image data as the defect, and detects presence of a dot in only the second region in the read image data as the defect.

11. An inspection apparatus for inspecting printed matter, the inspection apparatus comprising:
a hardware processor configured to detect a defect within read data obtained by reading the printed matter,
wherein the hardware processor is configured to:
detect the defect based on the fact that a pixel value of the read data is smaller than a first threshold, in a first region in which a character is formed; and
detect the defect based on the fact that a pixel value of the read data is larger than a second threshold, in a second region in which a character is not formed.

12. A nontransitory computer readable medium encoded with a computer readable inspection program, the inspection program comprising:
detecting a defect within read data obtained by reading the printed matter,
detecting the defect based on the fact that a pixel value of the read data is smaller than a first threshold, in a first region in which a character is formed; and
detecting the defect based on the fact that a pixel value of the read data is larger than a second threshold, in a second region in which a character is not formed.

* * * * *